(12) United States Patent
Park et al.

(10) Patent No.: US 9,034,394 B2
(45) Date of Patent: May 19, 2015

(54) METHODS OF PREPARING RED CLAY PROCESSED MATERIAL AND ALKALI IONIZED WATER

(75) Inventors: Jung-Keug Park, Seoul (KR); Moon Young Yoon, Seoul (KR)

(73) Assignee: Dongguk University Industry-Academic Cooperation Foundation, Korea (KR)

( * ) Notice: Subject to any disclaimer, the term of this patent is extended or adjusted under 35 U.S.C. 154(b) by 256 days.

(21) Appl. No.: 13/576,870

(22) PCT Filed: Feb. 3, 2010

(86) PCT No.: PCT/KR2010/000673
§ 371 (c)(1),
(2), (4) Date: Aug. 23, 2012

(87) PCT Pub. No.: WO2011/096600
PCT Pub. Date: Aug. 11, 2011

(65) Prior Publication Data
US 2012/0321725 A1  Dec. 20, 2012

(51) Int. Cl.
*C02F 1/50* (2006.01)
*C04B 33/14* (2006.01)
*C04B 33/32* (2006.01)
*C04B 35/626* (2006.01)

(52) U.S. Cl.
CPC .............. *C02F 1/50* (2013.01); *C02F 2303/08* (2013.01); *C04B 33/14* (2013.01); *C04B 33/323* (2013.01); *C04B 35/6261* (2013.01); C04B 2235/3201 (2013.01); C04B 2235/3206 (2013.01); C04B 2235/3208 (2013.01); C04B 2235/3232 (2013.01); C04B 2235/3272 (2013.01); C04B 2235/447 (2013.01); C04B 2235/656 (2013.01); C04B 2235/6567 (2013.01)

(58) Field of Classification Search
None
See application file for complete search history.

(56) References Cited

FOREIGN PATENT DOCUMENTS

| KR | 20-0421511 | 7/2006 |
|----|------------|--------|
| KR | 10-0740860 | 7/2007 |
| KR | 10-0886082 | 2/2009 |
| KR | 100886082 B1 * | 2/2009 |
| KR | 20-2009-0011222 | 11/2009 |

OTHER PUBLICATIONS

KR 10-10886082 Machine Translation (2009).*
International Search Report mailed Nov. 2, 2010 for International Application No. PCT/KR2010/000673.

* cited by examiner

*Primary Examiner* — Carlos Azpuru
*Assistant Examiner* — Casey Hagopian
(74) *Attorney, Agent, or Firm* — Swanson & Bratschun, L.L.C.

(57) ABSTRACT

Provided is a method of preparing a red clay processed material using red clay and sodium hydroxide and a red clay processed material having anti-corrosive and virus disinfecting activity. Also, a method of preparing alkali ionized water having excellent anti-bacterial, virus disinfecting and anti-corrosive activity using the red clay processed material, alkali ionized water using the same, and a functional product including the same are provided. The red clay processed material and the method of preparing alkali ionized water using the same can reduce the reaction temperature and reaction time compared to a conventional process, thereby significantly reducing the production cost. The red clay processed material and the alkali ionized water have excellent anti-bacterial, anti-corrosive, and virus disinfecting activity and are not toxic, so they can be widely applied in various health-care and agricultural, livestock, and marine fields such as an agent for preventing viral infectious diseases, a food preservative, a natural agricultural pesticide or fertilizer, paint, feed, an eco-friendly construction material, a red tide/green tide inhibitor, a cosmetic additive, or an anti-corrosive agent.

8 Claims, 3 Drawing Sheets

E.coli KCCM 70030

P. aerusinosa KACC 10232

S. aureus KACC 11764

B. subtilis KACC 10111

Before Washing

Tap Water

Add 0.1% of
Alkali Ionized Water Concentrate

Add 0.5% of $Na_2CO_3$

After Washing

Tap Water

Add 0.1% of
Alkali Ionized Water Concentrate

Add 0.5% of $Na_2CO_3$

Fig. 4

| Sample Name | Reaction Time (min.) | Dilution $10^{-2}$ $10^{-3}$ $10^{-4}$ $10^{-5}$ $10^{-6}$ $10^{-7}$ $10^{-8}$ $10^{-9}$ | Viral Titer (PFU/ml) | Decrease Rate in Viral Titer (Virus Disinfecting Activity) |
|---|---|---|---|---|
| PBS | 0 | | 750,000,000 | 0% |
| PBS | 60 | | 800,000,000 | 0% |
| MTYoco | 10 | | 16,500,000 | 97.9% |
| MTYoco | 30 | | <10,000 | >99.9987% |
| MTYoco | 60 | | <10,000 | >99.9987% |
| MTYoco CT | | $10^{-1}$ (6.3%) $10^{-2}$ (0.087%) CT  CT | *CT: cytotoxic | |

Fig. 5

METHODS OF PREPARING RED CLAY PROCESSED MATERIAL AND ALKALI IONIZED WATER

RELATED APPLICATIONS

This application is a 35 U.S.C. §371 national phase application of PCT/KR2010/000673 (WO 2011/096600), filed on Feb. 3, 2010, entitled "METHODS OF PREPARING RED CLAY PROCESSED MATERIAL AND ALKALI IONIZED WATER".

TECHNICAL FIELD

The present invention relates to a method of preparing a red clay processed material using red clay and sodium hydroxide, and a red clay processed material having anti-corrosive and virus disinfecting activity.

The present invention also relates to a method of preparing alkali ionized water having excellent anti-bacterial, virus disinfecting and anti-corrosive activity using the red clay processed material, alkali ionized water prepared by the method, and a functional product including the same.

BACKGROUND ART

Entering the 21st century, cultural trends are increasingly tending toward a happier life around the world, and awareness of the environment and sanitation has become widespread. Due to the spread of viral infections such as H1N1 flu, SARS, bird flu, and HIV, contamination by agricultural pesticides and heavy metals, and infectious diseases on a large scale such as foot-and-mouth disease and mad cow disease, the attention to the safety of food has increased and legal regulations have been tightened. Thus, anti-bacterial and virus disinfecting products are important for the sanitation and health of people and the economy.

Meanwhile, synthetic antiseptics currently used for food and cosmetics, and cleaning products for preventing the H1N1 flu are limited in their amount and uses due to their toxicity, and thus are not able to exhibit sufficient activity. In addition, due to chronic side effects, they actually pose a health threat. On the other hand, natural antiseptics are widely used due to the bad reputation of synthetic antiseptics and the preference for natural products derived from nature. However, natural antiseptics rarely exist in nature, and thus are difficult to find. They are composed of organic components, so that they decompose easily according to changes in the surrounding conditions including temperature, chemical substances, UV, and biological resistance.

However, anti-bacterial and virus disinfecting products derived from inorganic natural substances can overcome such disadvantages of the organic natural antiseptics.

Red clay is a mineral obtained from nature, which is widely spread in arid and semi-arid regions and covers about 10% of the Earth s surface. Red clay has a porous structure, and has characteristics of strong adsorption, deodorization, buffering, ion-exchange, and emission of far-infrared radiation, so that it is widely applied in construction materials, cosmetic additives, and other health-care products.

The main component of red clay, i.e., pure $SiO_2$ or a natural mineral containing abundant $SiO_2$, is changed into a water-soluble silicate by reaction with an alkali substance at a high temperature of 1400° C. or more when it is to be used as a corrosion and scale inhibitor or an agricultural fertilizer. However, in a conventional process, such a reaction is performed for a long time at a high temperature ranging from 1400 to 1700° C., which results in high production costs.

DISCLOSURE OF INVENTION

Technical Problem

Therefore, the present invention provides a method of preparing a red clay processed material using red clay and sodium hydroxide which can decrease reaction temperature and time and thus reduce production costs, and a red clay processed material prepared by the above-mentioned method, which has anti-corrosive and virus disinfecting activity.

The present invention also provides a method of preparing alkali ionized water using the red clay processed material, alkali ionized water prepared by the same, and a functional product including the same.

Technical Solution

An aspect of the present invention provides a method of preparing a red clay processed material including: mixing 90 to 10 parts by weight of sodium hydroxide with 10 to 90 parts by weight of red clay to obtain a mixed composition; heating the mixed composition at 1100 to 1300° C. for 1 to 4 hours to melt the mixed composition, thereby obtaining a liquid melt; and cooling the melt.

Another aspect of the present invention provides an anti-corrosive composition and a virus disinfecting composition including the red clay processed material prepared by the above-described method.

Still another aspect of the present invention provides a method of preparing alkali ionized water including: mixing 90 to 10 parts by weight of sodium hydroxide with 10 to 90 parts by weight of red clay to obtain a mixed composition; heating the mixed composition at 1100 to 1300° C. for 1 to 4 hours to melt the mixed composition, thereby obtaining a liquid melt; cooling the melt; pulverizing the cooled resultant into a microparticle or nanoparticle size; and adding the pulverized resultant to water to perform extraction at 100 to 150° C. for 1 to 5 hours.

Yet another aspect of the present invention provides alkali ionized water having anti-bacterial, anti-corrosive and virus disinfecting activity, which is prepared by the above-described method, and a functional product including the same.

Advantageous Effects

The red clay processed material and the method of preparing alkali ionized water using the same can reduce the reaction temperature and reaction time compared to a conventional process, thereby significantly reducing the production cost. The red clay processed material and the alkali ionized water have excellent anti-bacterial, anti-corrosive, and virus disinfecting activity and are not toxic, so they can be widely applied in various health-care and agricultural, livestock, and marine fields such as an agent for preventing viral infectious diseases, a food preservative, a natural agricultural pesticide or fertilizer, paint, feed, an eco-friendly construction material, a red tide/green tide inhibitor, a cosmetic additive, or an anti-corrosive agent.

BRIEF DESCRIPTION OF DRAWINGS

The above and other features and advantages of the present invention will become more apparent to those of ordinary skill in the art by describing in detail exemplary embodiments thereof with reference to the attached drawings in which:

FIG. 4 illustrates the virus disinfecting activity of the alkali ionized water according to the present invention; and FIG. 5 also illustrates the virus disinfecting activity of the alkali ionized water according to the present invention.

MODE FOR THE INVENTION

Figure 1:
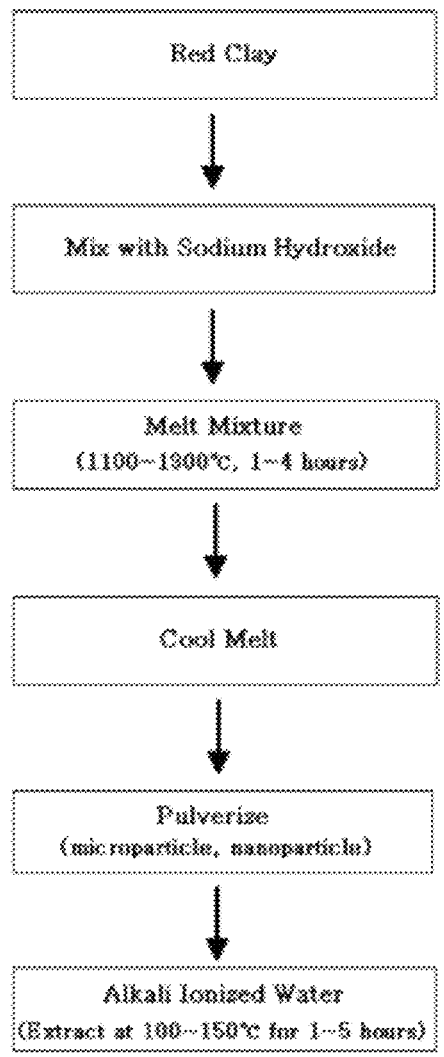
FIG. 1 schematically illustrates a method of preparing a red clay processed material using red clay and alkali ionized water according to the present invention.

Various exemplary embodiments will now be described more fully with reference to the accompanying drawings in which some exemplary embodiments are shown. In the drawings, the application field and range may be expanded for clarity.

The present invention provides a method of preparing a red clay processed material, including: 1) mixing 90 to 10 parts by weight of sodium hydroxide with 10 to 90 parts by weight of red clay to obtain a mixed composition; 2) heating the mixed composition at 1100 to 1300° C. for 1 to 4 hours to melt the mixed composition, thereby obtaining a liquid melt; and 3) cooling the melt.

According to an exemplary embodiment, the red clay includes 10 to 30 parts by weight of $Al_2O_3$ and 0.5 to 20 parts by weight of $Fe_2O_3$ with 40 to 80 parts by weight of $SiO_2$ as essential components. In addition, the red clay may include 0.1 to 5 parts by weight of at least one component selected from the group consisting of CaO, MgO, $K_2O$, $Na_2O$, $TiO_2$ and $P_2O_5$. The red clay may be obtained from nature by a conventional method in the art or may be a commercially available product.

Characteristics of one of the essential components for the red clay, $SiO_2$, include strong adsorption, anti-bacterial and deodorant abilities, release of minerals, and an increase in dissolved oxygen. However, since $SiO_2$ is substantially insoluble, when a fine powder of red clay including $SiO_2$ as the main component is simply added, it is difficult to obtain all the effects described above. However, when a particular amount of sodium hydroxide is mixed with red clay including $SiO_2$ as the main component, and the mixture is then heated at high temperature so as to be melted, the composition of $SiO_2$ reacts with sodium hydroxide, and is thus changed into an ionic form of $SiO_3^-$, thereby becoming soluble in water.

Operation 1) is to obtain a mixed composition by mixing 90 to 10 parts by weight of sodium hydroxide with 10 to 90 parts by weight of red clay. For example, for 20 to 80 parts by weight of red clay, 80 to 20 parts by weight of sodium hydroxide may be mixed, for 30 to 70 parts by weight of red clay, 70 to 30 parts by weight of sodium hydroxide may be mixed, for 40 to 60 parts by weight of red clay, 60 to 40 parts by weight of sodium hydroxide may be mixed, or for 50 parts by weight of red clay, the same amount, i.e., 50 parts by weight of sodium hydroxide may be mixed. As the amount of sodium hydroxide in the mixed composition increases, the yield of ionized $SiO_2$ increases. Thus, during the preparation of alkali ionized water, Si components released into the alkali ionized water also increase. However, when a large amount of sodium hydroxide is added, it can cause cytotoxicity. Thus, during the preparation of the alkali ionized water, a mixed ratio of the red clay to the sodium hydroxide may be adjusted such that a concentration of 55 mg/L or less of Si is released into the water (see Table 1).

Operation 2) is to obtain a liquid melt by heating the mixed composition obtained in Operation 1) at 1100 to 1300° C. for 1 to 4 hours. Through such a heating and melting process, the main component of the red clay, $SiO_2$, is changed into sodium silicate according to the reaction formula, $SiO_2 + 2NaOH \rightarrow Na_2SiO_3 + H_2O\uparrow$, and dissolved in water. The more sodium hydroxide is included, the higher the solubility in water that is obtained.

When the red clay and the sodium hydroxide are mixed in the above-mentioned ratio and then melted, the melting temperature and time are decreased to 1100 to 1300° C. and 1 to 4 hours, so that the production costs can be reduced. The melting temperature may be 1100 to 1290° C., 1100 to 1280° C., 1100 to 1270° C., 1100 to 1260° C., or 1100 to 1250° C. The melting time may be 1 to 4 hours, 2 to 4 hours, or 2 to 3 hours. Since the red clay has a porous structure and a much lower strength than pure $SiO_2$ or other stones, it can melt at a lower temperature, and particularly, when using the sodium hydroxide as an alkali substance, the melting temperature of red clay can be further decreased due to an exothermic reaction of sodium hydroxide during the melting process. Here, when the melting process is performed at less than 1100° C., the red clay does not melt, and thus almost no water-soluble ions, $SiO_3^-$, are produced. However, when the melting process is performed at more than 1300° C., all the components of the natural mineral are oxidized, and thereby lost as gases. Thus, the yield is reduced, and the energy cost is increased, resulting in economic loss.

Operation 3) is to cool the melt obtained in Operation 2). The cooling process may be performed by a conventional method in the art. For example, the cooling process may be performed by, but is not limited to, rapid cooling or low-temperature cooling of the melt using a cooling system, or by naturally cooling the melt at room temperature. When the cooling system is used, an additional cost is involved, so that the natural cooling at room temperature is preferable, but for mass-production, the rapid or low-temperature cooling system may be needed to rapidly produce many products. According to the exemplary embodiment of the present invention, the melt may be naturally cooled at room temperature for 24 to 48 hours.

According to an exemplary embodiment of the present invention, the cooled resultant obtained in Operation 3) may be pulverized into a microparticle or nanoparticle size. After the cooled resultant is pulverized into a microparticle or nanoparticle size, depending on the intended use, the pulverized resultant may be prepared as a liquid, colloidal or solid product, for example, microparticle powder having a size of 1 to 1000 μm, or a nanoparticle powder having a size of 1 to 1000 nm. The pulverizing process may be performed by a conventional method in the art.

Accordingly, a red clay processed material including 40 to 80 parts by weight of $SiO_2$, 10 to 30 parts by weight of $Al_2O_3$, and 0.5 to 20 parts by weight of $Fe_2O_3$ as the essential components, and 0.1 to 5 parts by weight of at least one selected from the group consisting of CaO, MgO, $K_2O$, $Na_2O$, $TiO_2$, and $P_2O_5$ as an additional component may be prepared, in which the $SiO_2$ exists in the form of an ion, $SiO_3$. The red clay processed material has excellent anti-bacterial, anti-corrosive, and virus disinfecting activity, and is not toxic to humans, so that it can be very useful in preparing a functional product designed to have particular desired activities by being added to an agent for preventing viral infectious diseases, a food preservative, a natural agricultural pesticide or fertilizer, paint, feed, an eco-friendly construction material, a red tide/green tide inhibitor, a cosmetic additive, or an anti-corrosive agent.

Thus, the present invention provides an anti-corrosive or virus disinfecting composition including the red clay processed material prepared according to the above-described method.

According to the following exemplary embodiment, when a metal plate is treated with an alkali ionized water concentrate including the red clay processed material according to the present invention, almost no corrosion is found on the metal plate, which proves that the anti-corrosive activity of the alkali ionized water is excellent. It also proves that the alkali ionized water has perfect virus disinfecting activity to poliovirus.

The present invention also provides a method of preparing alkali ionized water, including: 1) mixing 90 to 10 parts by weight of sodium hydroxide with 10 to 90 parts by weight of red clay to obtain a mixed composition; 2) heating the mixed composition at 1100 to 1300° C. for 1 to 4 hours to melt the mixed composition, thereby obtaining a liquid melt; 3) cooling the melt; 4) pulverizing the cooled resultant into a microparticle or nanoparticle size; and 5) adding the pulverized resultant to water to perform extraction at 100 to 150° C. for 1 to 5 hours.

Operations 1) through 4) are operations of preparing the red clay processed material, Operation 5) is an operation of preparing the alkali ionized water by adding the pulverized resultant of the red clay processed material obtained from the previous operations to water for extraction. Here, the water may be distilled water, and the pulverized resultant may be added at 1 to 99% (w/v), 5 to 90% (w/v), 10 to 90% (w/v), 10 to 80% (w/v), 10 to 70% (w/v), 10 to 60% (w/v), 10 to 50% (w/v), 10 to 40% (w/v), 10 to 30% (w/v), 10 to 20% (w/v) or 5 to 30%. The solution prepared by adding the red clay processed material to water may be extracted at 100 to 150° C., 110 to 140° C., 110 to 130° C., 115 to 130° C., or 120 to 125° C. for 1 to 5 hours, 2 to 5 hours, 2 to 4 hours, or 2 to 3 hours. The extract was cooled at room temperature, and then vacuum-filtered, thereby preparing alkali ionized water.

The present invention provides alkali ionic water having anti-bacterial, anti-corrosive and virus disinfecting activity prepared by the above method. The alkali ionized water according to the present invention has excellent anti-bacterial, anti-corrosive, and virus disinfecting activity, and when the Si concentration is 55 mg/L or less, it is not toxic to humans (see Table 1, and FIGS. 4 and 5). Thus, the alkali ionized water may be useful in preparing a functional product designed to have the above-mentioned activity by being added to an agent for preventing viral infectious diseases, a food preservative, a natural agricultural pesticide or fertilizer, paint, feed, an eco-friendly construction material, a red tide/green tide inhibitor, a cosmetic additive, or an anti-corrosive agent.

Thus, the present invention provides a functional product including alkali ionized water having anti-bacterial, anti-corrosive and virus disinfecting activity prepared according to the above-described method.

The red clay processed material or alkali ionized water according to the present invention may be added at 0.001 to 99.999 wt %, 0.01 to 99.99 wt %, or 0.1 to 99.9 wt %, on the basis of the total weight of the functional product, to an agent for preventing viral infectious diseases, a food preservative, a natural agricultural pesticide or fertilizer, paint, feed, an eco-friendly construction material, a red tide/green tide inhibitor, a cosmetic additive, or an anti-corrosive agent. In a particular case, the red clay processed material or alkali ionized water may be used alone, and not as an additive. The functional product including the above-mentioned amount of the red clay processed material or alkali ionized water has excellent anti-bacterial, anti-corrosive and virus disinfecting activity.

EXAMPLES

Hereinafter, to facilitate understanding of the present invention, the present invention will be described in detail with reference to examples. However, the following examples are merely provided to explain, and not to limit, the scope of the present invention. The examples are provided to more fully explain the present invention to one of ordinary skill in the art.

Example 1

Preparation of Silicate Using Red Clay and Sodium Hydroxide 100 g of red clay (dry powder red clay from Gochang, 798 Chiram-ri, Gongeupmyun, Gochang-gun, Jeonbuk) and 100 g of sodium hydroxide were measured and then put into a stirrer to be mixed. The mixture was heated in a crucible at 1200° C. for 3 hours in an electric furnace so as to be completely dissolved. The liquid melt, in which all the components were completely dissolved, was cooled at room temperature for 24 hours, thereby obtaining a silicate.

Example 2

Preparation of Alkali Ionized Water

The silicate obtained in Example 1 was crushed into a certain size using a hammer mill (Hankook Crusher Co., Ltd.), and then pulverized into particle powder having a size of 45 μm or less using a ball mill (Daehan Science) including a zirconia ball having a diameter of 5 mm. 10% (w/v) of the microparticle powder was added to distilled water, and extracted at 121° C. for 3 hours using an autoclave. The extract was cooled at room temperature for 18 hours. Subsequently, the cooled extract was vacuum-filtered, thereby obtaining alkali ionized water. The alkali ionized water was evaporated at 80° C. for 3 days to have a Si concentration of 93.1 g/L, thereby obtaining a concentrate, which was used for the following experimental example.

The Korean Test and Research Institute was requested to perform componential analysis of alkali ionized water. The concentration was diluted 1000 times and the results obtained are shown in Table 1. Referring to Table 1, it can be seen that the Si concentration in the alkali ionized water after diluting the concentration 1000 times was 54.9 mg/L. Referring to Experimental Example 3, it can be confirmed that when the concentration was diluted 1000 times or more, cytotoxicity of the alkali ionized water was not detected. That is, the results shown in Table 1 show that when the concentration of Si eluted to water is 55 mg/L or less, cytotoxicity of the alkali ionized water was not detected.

TABLE 1

| Test Item | Result (Unit: mg/L) | Test Method |
|---|---|---|
| Cr | 0.00 | Standard Methods: 2005 |
| Fe | 0.00 | Standard Methods: 2005 |
| Zn | 0.00 | Standard Methods: 2005 |
| Cu | 0.00 | Standard Methods: 2005 |

TABLE 1-continued

| Test Item | Result (Unit: mg/L) | Test Method |
|---|---|---|
| Cd | 0.00 | Standard Methods: 2005 |
| Hg | 0.00 | Standard Methods: 2005 |
| As | 0.01 | Standard Methods: 2005 |
| Pb | 0.00 | Standard Methods: 2005 |
| Cr(VI) | 0.00 | Standard Methods: 2005 |
| Mn | 0.00 | Standard Methods: 2005 |
| Al | 0.79 | Standard Methods: 2005 |
| Ca | 0.12 | Standard Methods: 2005 |
| Mg | 0.01 | Standard Methods: 2005 |
| Si | 54.9 | Standard Methods: 2005 |

Experimental Example 1-1

Test for Anti-Bacterial Activity of Alkali Ionized Water

For an anti-bacterial activity test, *E. coli* KCCM 70030 strain was provided from the Korean Culture Center of Microorganisms (KCCM), and *Bacillus subtilis* KACC 10111, *Pseudomonas aeruginosa* KACC 10232, and *Staphylococcus aureus* KACC 10196 strains were provided from the Korean Agricultural Culture Collection (KACC).

The strains were each inoculated onto agarose nutrient media (0.3% beef extract, 0.5% peptone, pH 7.0), and an 8-mm paper disk (ADVANTEC) soaked in the alkali ionized water obtained in Example 2 was put in the middle of each petri dish. The *Pseudomonas aeruginosa* KACC 10232 strain was incubated at 30° C., and other strains were incubated at 37° C. using a shaking incubator at 200 rpm for 24 hours. The anti-bacterial activity was measured by halo size.

Figure 2:
FIG. 2 illustrates the anti-bacterial activity of the alkali ionized water according to the present invention.
Figure 2:
Figure 2:
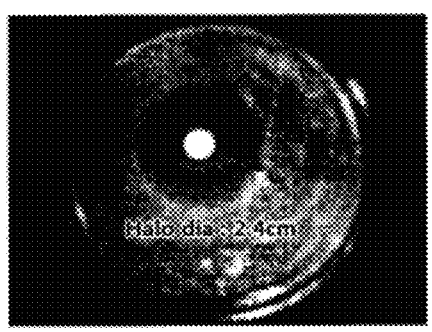
Figure 2:
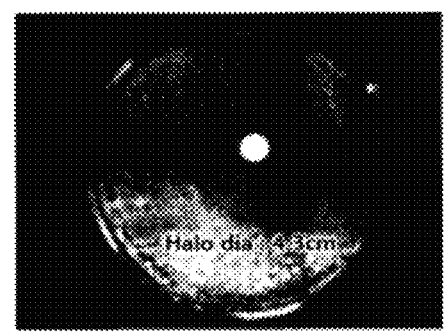

Referring to FIG. 2, the *Bacillus subtilis* KACC 10111 strain showed the highest anti-bacterial activity, and the *Staphylococcus aureus* KACC 10196 strain showed the lowest anti-bacterial activity. However, other test strains also showed the anti-bacterial activity.

Experimental Example 1-2

Test for Anti-Bacterial Activity of Alkali Ionized Water

Anti-bacterial activity was tested again by a minimum inhibitory concentration (MIC) method. The alkali ionized water prepared in Example 2 was added to 100 ml of distilled water at a concentration of 0, 0.1, 0.2, 0.4 and 0.8% (w/v), and 100 µl of each of the culture solutions having the strains incubated in the above-mentioned example was inoculated thereto. Subsequently, the *Pseudomonas aeruginosa* KACC 10232 strain was incubated at 30° C., and the other strains were incubated at 37° C. using a shaking incubator at 200 rpm for 24 hours. 100 µl of each of the samples before and after the incubation was taken to be inoculated into a solid culture medium prepared by adding 1.5% agarose to the medium previously prepared, and was then incubated for 2 days in an incubator at 30 and 37° C. Afterwards, the growth of the strains was examined, and the results are shown in Table 2.

TABLE 2

| Strain | Anti-bacterial Treatment | Alkali Ionized Water (w/v %) | | | | |
|---|---|---|---|---|---|---|
| | | 0 | 0.1 | 0.2 | 0.4 | 0.8 |
| *E. coli* KCCM 70030 | Before | + | + | + | + | + |
| | After | + | + | + | − | − |
| *Bacillus Subtilis* KACC 10111 (bacteria) | Before | + | + | + | + | + |
| | After | + | − | − | − | − |
| *Pseudomonas aeruginosa* KACC 10232 (bacteria) | Before | + | + | + | + | + |
| | After | + | + | − | − | − |
| *Staphylococcus aureus* KACC 10196 (bacteria) | Before | + | + | + | + | + |
| | After | + | + | + | + | + |

As shown in Table 2, it was confirmed that when *E. coli*, *Bacillus*, *Pseudomonas*, and *Staphylococcus* were treated with 0.4, 0.1 or more, 0.2, and 0.8% or more of the alkali ionized water, respectively, the growth of these strains can be effectively inhibited, thereby obtaining a high anti-bacterial activity.

Experimental Example 2

Test for Anti-Corrosive Activity of Alkali Ionized Water

A metal plate was treated with alkali ionized water concentrate obtained in Example 2, and maintained for two weeks in a growth chamber at 20 C and a humidity of 50% to confirm the anti-corrosive activity of the alkali ionized water.

Figure 3:
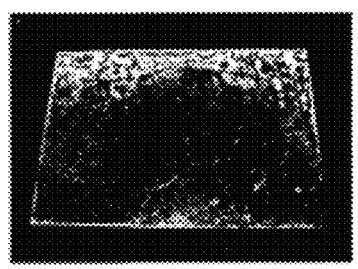
FIG. 3 illustrates the anti-corrosive activity of the alkali ionized water according to the present invention.
Figure 3:
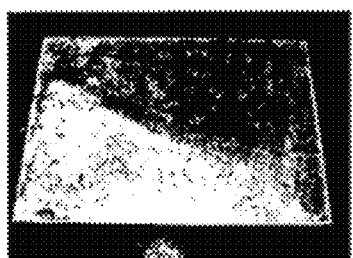
Figure 3:
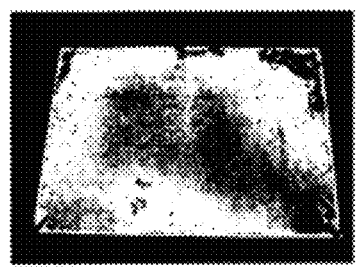
Figure 3:
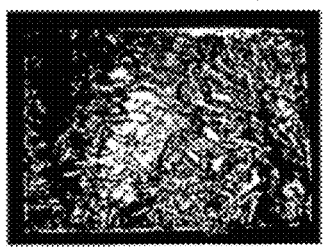
Figure 3:
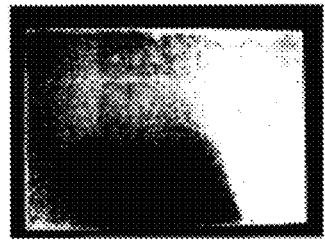
Figure 3:
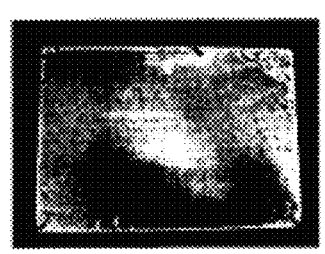

As shown in FIG. 3, compared to when it was treated with tap water, when the metal plate was treated with 0.1% of the alkali ionized water concentrate according to the present invention, the degree of corrosion on the surface of the metal was very low, showing that the alkali ionized water had excellent anti-corrosive activity.

Experimental Example 3

Test for Virus Disinfecting Activity of Alkali Ionized Water

To confirm the virus disinfecting activity of the alkali ionized water of the present invention, the virus lab in the Korean Research Institute of Chemical Technology (KRICT) was requested to test for the virus disinfecting activity. The virus disinfecting activity was assayed by a plaque assay. For the assay, as a test virus, poliovirus type 3 (Sabin) was used, and as a test cell, a HeLa cell was used. The alkali ionized water concentrate obtained in Example 2 was melted using a PBS solution and then stored at −20° C. The concentrate was diluted with the culture solution before being used on the same day of the test. As the test virus, poliovirus type 3 (Sabin) was used, and as a host cell, a human cervical carcinoma cell (HeLa) was used.

100 µl virus was mixed with 200 µl of the alkali ionized water concentrate so the alkali ionized water had a concentration of 67%. As the control group, instead of the alkali ionized water, PBS was mixed. After the mixed sample was maintained at room temperature for 10, 30, and 60 minutes, 35 µl of the liquid was taken to continuously dilute it 10 times, and then infected into the HeLa cells incubated on a 48-well plate. After being incubated for 3 days, the cells were fixed and dyed to observe plaques under a microscope.

As shown in FIGS. 4 and 5, in a sample (MYYoon) to which the alkali ionized water according to the present invention was added, compared to the control sample (PBS), a viral titer (virus survival rate) was significantly decreased, and thus a decrease rate of the viral titer was 99.9987% or more. Thus, it can be confirmed that the sample has excellent virus disinfecting activity. To determine cytotoxicity of the alkali ionized water, 200 µl of alkali ionized water was added to 100 µl of PBS instead of a virus, thereby preparing a sample (Mock). The Mock sample was diluted 1000 times, and it can be confirmed that the sample has no cytotoxicity. A phenomenon in which a virus is found at some dilution factors occurred when fine particles of the red clay processed material in the mixed sample were not completely removed, and the virus was adsorbed to such porous particles of the red clay processed material.

Methods of preparing a red clay processed material and alkali ionized water using the same according to the present invention can drastically decrease production cost by reducing the reaction temperature and shortening the reaction time, compared to a conventional process. The red clay processed material and the alkali ionized water have excellent anti-bacterial, anti-corrosive, and virus disinfecting activity and are not toxic, so that they can be widely applied in various health-care and agricultural, livestock, and marine fields such as an agent for preventing viral infectious diseases, a food preservative, a natural agricultural pesticide or fertilizer, paint, feed, an eco-friendly construction material, a red tide/green tide inhibitor, a cosmetic additive, or an anti-corrosive agent.

While the invention has been shown and described with reference to certain exemplary embodiments thereof, it will be understood by those skilled in the art that various changes in form and details may be made therein without departing from the concept and scope of the invention as defined by the appended claims.

The invention claimed is:

1. A method of preparing alkali ionized water, comprising:
   mixing 90 to 10 parts by weight of sodium hydroxide with 10 to 90 parts by weight of red clay to obtain a mixed composition such that a concentration of 55 mg/L or less of Si is released into the water;
   heating the mixed composition at about 1100 to about 1290° C. for about 1 to about 4 hours to melt the mixed composition, thereby obtaining a liquid melt;
   cooling the melt;
   pulverizing the cooled resultant obtained by cooling the melt into a microparticle or nanoparticle size; and
   adding the pulverized resultant to water to perform extraction at about 100 to about 150° C. for about 1 to about 5 hours.

2. The method according to claim 1, wherein the mixed composition is obtained by mixing 50 parts by weight of sodium hydroxide with 50 parts by weight of red clay.

3. The method according to claim 1, wherein the red clay includes 10 to 30 parts by weight of $Al_2O_3$ and 0.5 to 20 parts by weight of $Fe_2O_3$ with 40 to 80 parts by weight of $SiO_2$ as essential components, and 0.1 to 5 parts by weight of at least one component selected from the group consisting of CaO, MgO, $K_2O$, $Na_2O$, $TiO_2$ and $P_2O_5$ as an additional component.

4. The method according to claim 1, wherein the pulverized resultant is added at 5 to 30% (w/v).

5. An alkali ionized water composition having anti-bacterial, anti-corrosive, and virus disinfecting activity prepared by:
   mixing 90 to 10 parts by weight of sodium hydroxide with 10 to 90 parts by weight of red clay to obtain a mixed composition such that a concentration of 55 mg/L or less of Si is released into the water;
   heating the mixed composition at about 1100 to about 1290° C. for about 1 to about 4 hours to melt the mixed composition, thereby obtaining a liquid melt;
   cooling the melt;
   pulverizing the cooled resultant obtained by cooling the melt into a microparticle or nanoparticle size; and
   adding the pulverized resultant to water to perform extraction at about 100 to about 150° C. for about 1 to about 5 hours.

6. The alkali ionized water composition of claim 5 wherein the mixed composition is obtained by mixing 50 parts by weight of sodium hydroxide with 50 parts by weight of red clay.

7. The alkali ionized water composition of claim 5 wherein the red clay includes 10 to 30 parts by weight of $Al_2O_3$ and 0.5 to 20 parts by weight of $Fe_2O_3$ with 40 to 80 parts by weight of $SiO_2$ as essential components, and 0.1 to 5 parts by weight of at least one component selected from the group consisting of CaO, MgO, $K_2O$, $Na_2O$, $TiO_2$ and $P_2O_5$ as an additional component.

8. The alkali ionized water composition of claim 5 wherein the pulverized resultant is added at 5 to 30% (w/v).

* * * * *